United States Patent [19]

Vesel et al.

[11] Patent Number: 4,993,025
[45] Date of Patent: Feb. 12, 1991

[54] HIGH EFFICIENCY IMAGE DATA TRANSFER NETWORK

[75] Inventors: John F. Vesel, Willowick; Fred C. Mailey, S. Euclid; Pradipa Subramaniam, Richmond Hts.; Robert A. Cecil, Solon, all of Ohio

[73] Assignee: Picker International, Inc., Highland Hts., Ohio

[21] Appl. No.: 439,859

[22] Filed: Nov. 21, 1989

[51] Int. Cl.$^5$ ............................................. H04J 3/24
[52] U.S. Cl. .................................. 370/94.1; 370/60; 370/85.12; 370/85.4
[58] Field of Search .................. 370/94.1, 85.12, 85.4, 370/60, 112

[56] References Cited

U.S. PATENT DOCUMENTS

| | | | |
|---|---|---|---|
| 4,780,870 | 10/1988 | McHarg et al. | 370/85.15 |
| 4,785,449 | 11/1988 | Nakamura et al. | 370/85.4 |
| 4,797,883 | 1/1989 | Kraus | 370/112 |

Primary Examiner—Douglas W. Olms
Assistant Examiner—Christopher O. Edwards
Attorney, Agent, or Firm—Fay, Sharpe, Beall, Fagan, Minnich & McKee

[57] ABSTRACT

A network (A) carries large image blocks among medical diagnostic equipment (20, 22, 24), archive computer (26), and data handling and display stations (28, 30). Four kilobyte packets of 4 megabyte image blocks are moved from transmit buffers (38) to queuing buffers (42). The order in which packets from the queuing buffers are transmitted on the network medium (10) is determined by a combination of an assigned priority, duration in the buffer, and a statistical availability of the addressed receiving node. A data link (52) at the receiving node includes an elasticity buffer (122) which stores a small plurality of bits, e.g. 5, to accommodate for variances in the clock speed of the transmitting and receiving nodes. A buffer table (60) monitors memory addresses at which preceding data packets corresponding to the same image are stored and provides address information to send each subsequently received packet. Before transmitting the image data packet, the transmitting node data link first sends a query to the receiving node to check availability to avoid the transmission of relatively large data packets to unavailable nodes. Each transmitting node normally passes the token after it has transmitted one packet of data. When the transmitting node holds the token for several sequential data packet transmissions, it passes a restricted token which allows the other nodes to transmit high priority small messages that are much smaller than the image data packets.

20 Claims, 6 Drawing Sheets

HIGH EFFICIENCY IMAGE DATA TRANSFER NETWORK

BACKGROUND OF THE INVENTION

The present invention relates to the art of transferring electronic data. It finds particular application in conjunction with the transfer of image data among electronic medical diagnostic equipment such as CT scanners, magnetic resonance imagers, digital x-ray, and other equipment that generates, processes or displays digital image information. However, it is to be appreciated that the invention will also find application in other areas, particularly areas which transfer large blocks of data.

Heretofore, medical diagnostic information has commonly been processed at each individual CT scanner, digital x-ray device, magnetic resonance imager or the like. Most often, the digital information is recorded on a removable disk or tape to facilitate carrying the image to other remote viewing locations. At the remote viewing locations, the radiologist could operate on the image data with various image enhancement algorithms and routines to enhance the diagnostic value for a particular application while the CT or other scanner was used to conduct further patient examinations. Rather than storing the image information on individual, portable disks. Some hospitals have installed a central computer system with a large memory capacity for storing all digital images and other diagnostic data.

Difficulty has arisen in transferring the image data among the scanners, the central archiving computer, distributed viewing terminals, and other stations. An image is typically about 4 megabytes of data. With improvements in the scanners and in the processing speed of the generated data, images will be made up of progressively larger blocks of digital data. Blocks of data of this magnitude are most easily transmitted on dedicated, direct transmission or communication lines. That is, with communication lines which interconnect each viewing terminal, for example, with each potential source of images. However, such direct dedicated lines are expensive and switching among them is inefficient. Moreover, conflict management, such as the conflict between several viewing terminals all requesting images from the same archive computer or CT scanner at the same time, are difficult to resolve.

More commonly, data is transferred among a plurality of stations or nodes on a common data bus. Various schemes have been developed for sharing the common bus, such as frequency or time division multiplexing. Most commonly, an asynchronous time division protocol is utilized.

To prevent packets of transmitted data from colliding or interacting on the data bus, various polling policies have been established. Commonly, a distributed polling policy is implemented, although central polling is also well known. Typical distributed or self polling schemes include token ring, logic ring, and the like.

On the whole, the hardware and protocols associated with central bus and ring architecture have high associated overhead. This overhead reduces the efficiency of the system and increases data transfer times. Moreover, these distributed systems and protocols were designed for applications with relatively small data packets by the standards of image data transfers. The prior art systems were also designed for flexibility to handle a wide range of applications. This flexibility again increases the overhead with no productive advantage in image data transfer applications.

Typically, at each data bus node, data is collected in the buffers of a file server from one or more sources. This data is recopied into a transport protocol hardware which adds its appropriate headers or other information. The data is copied from the buffers of the transport protocol to buffers of a queuing and multiplexing level, which again adds headers and other information to the data. The queuing and multiplexing level also oversees placing the data on the bus media in an efficient and fair way by the data link hardware. At the receive end, the data is again recopied from buffer to buffer as it is moved through the same layers, doubling the overhead.

The present invention provides a new and improved data transfer network which overcomes the above referenced problems and others.

SUMMARY OF THE INVENTION

In accordance with one aspect of the present invention, the transmit data link hardware which physically places the information on the network media is provided with direct access to the buffers of the file server without the data being repetitively recopied from layer to layer between the file server and the data link. Similarly, the receiving data link is provided with direct access to larger buffer memories of the file server without the data being recopied through the intermediate levels of the protocol.

In accordance with a more specific implementation of the invention, a data management means is provided which keeps track of the received data, the location in the file server memory that prior data has been loaded, and directs the newly received data to the appropriate location within the memory buffers.

In accordance with another aspect of the present invention, transmission priority is based not only on relative priority of the data to be transmitted but also on potential availability of the receiving node. That is, the data transmitting order is set on the basis of the priority of the data, the time it has been waiting, and the statistical availability of the designated receiving node. Data going to nodes which are traditionally available to receive are transmitted ahead of similar priority data going to a node which is often busy and cannot receive the data.

In accordance with another aspect of the present invention, the transmitting node transmits a query to the receiving node to determine whether it is available to receive data. Large blocks of image data are transmitted only when the receiving node answers that it is available.

In accordance with another aspect of the present invention, an image data transfer network is provided in which a transmitting node with a very high priority can seize the ring or network. For example, during a scan by a laser imager with a small, e.g. two line, buffer, data must be removed substantially immediately to make room for the subsequent lines. While the transmitting node has seized the network, other nodes can transmit small packets of data that are small enough to be transmitted in a time which is short compared to the collection time for two lines of data in the laser imager.

In accordance with another aspect of the present invention, a process for generating an ordered node list is provided. A data transmission is addressed to all downstream nodes. As each node which is on-line receives the transmission, it adds its designation to the carried information and retransmits it downstream. When the transmission has circulated back to the originating node, the originating node reads the ordered list of node designations and broadcasts the information concurrently to all addresses.

In accordance with another aspect of the present invention, each node is clocked independently. Although the clocks are all nominally the same frequency to the fourth or fifth decimal place, even this small frequency variation can make the difference of a few bits over the course of large data block transfers as are commonly found in transferring image data. Rather than adjusting the clocking rates of all the nodes to a common transfer rate, an elasticity buffer means is provided at each node. The buffer means is clocked in by clock or synchronization signals from the transmitting node and is clocked out by clock signals from the receiving node. The elasticity buffer means has an appropriate number of bytes of storage in order to accommodate any accumulation or shortfall of data attributable to the difference in the clock rates of the transmitting and receiving nodes.

In accordance with another aspect of the present invention, the processors at each node are commonly 32-bit processors, whereas the data transfer network is commonly an 8-bit network. Analogously, as 64 bit and other larger processors become available, the number of bits that the transfer network can accommodate will lag behind. To accommodate the difference in the number of parallel bits which the processor and the data transfer network can accommodate, a packing and unpacking means is provided at the receive and transmit portions of each node. At the receive side, the data from the transfer network is strobed into a series of buffers until the accumulated amount of data has the same number of bits as the processor, then all of the buffers are strobed concurrently to move the data to the processor. Analogously, on the transmit end, a series of multiplexor means are strobed to clock segments of data out of a register appropriately sized for the processor at several times the clocking rate of the processor. The strobing rate is selected such that all the data is transferred in smaller packets between processor clock pulses.

One advantage of the present invention is that it more efficiently transfers image or other large packets of data.

Another advantage of the present invention is that it is flexible and facilitates the adding of additional nodes to the network.

Still further advantages of the present invention will become apparent to those of ordinary skill in the art upon reading and understanding the following detailed description.

BRIEF DESCRIPTION OF THE DRAWINGS

The invention may take form in various steps and arrangements of steps or in various components and arrangements of components. The drawings are only for purposes of illustrating a preferred embodiment and are not to be construed as limiting the invention.

BRIEF DESCRIPTION OF THE PREFERRED EMBODIMENT

Figure 1:
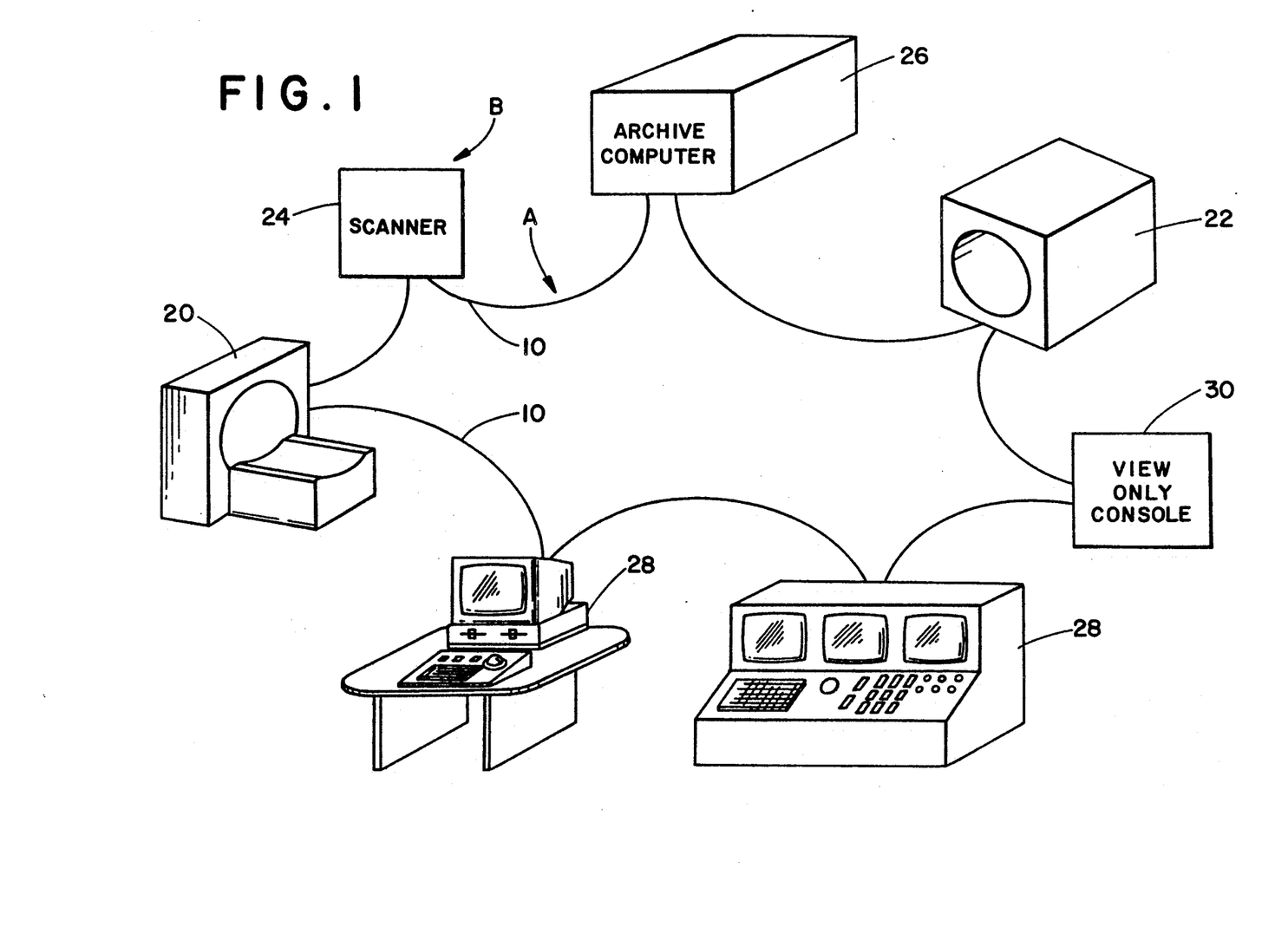
FIG. 1 is a system diagram of a data transfer network in accordance with the present invention.

With reference to FIG. 1, an image data transfer network A interconnects a plurality of stations or nodes B. In the preferred embodiment, the data transfer network is composed of a plurality of lengths of fiber optic cable 10 for transmitting data encoded light in a single direction from node to node. Of course, other transmission media may also be utilized as is known in the art. Each node retransmits the received information on the next length of fiber optic cable until the message has moved to each of the nodes and returned around the circle to the originating node.

Various nodes or stations may be provided. Typically, a plurality of scanners, such as a CT scanner 20, a magnetic resonance imager 22, and a laser, digital x-ray, nuclear camera, or other digital imager 24. The imagers at these nodes non-invasively examine a patient and generate image data indicative thereof. The imagers may process the image data at each station and transmit completed images or may convey the raw image data along the network to another node which is interconnected with an appropriately programmed computer for processing the data. An archiving computer memory means 26 stores a large plurality of images. Because images typically contain about 4 megabytes of data, the archiving memory means may typically have a plurality of hard disks. Other nodes of the network are connected with operator control stations 28 from which the operator may control a scan, may view a selected image, operate on the selected image or images with various enhancement routines to improve their diagnostic value, and the like. The operator terminals may be interconnected with a hard copy apparatus for converting the electronically displayed diagnostic images into hard copy images on film, paper, or the like. Other nodes of the system may be connected with a more simple physician viewing station 30 at which a physician or radiologist may call up and view selected images for diagnostic purposes.

Figure 2:
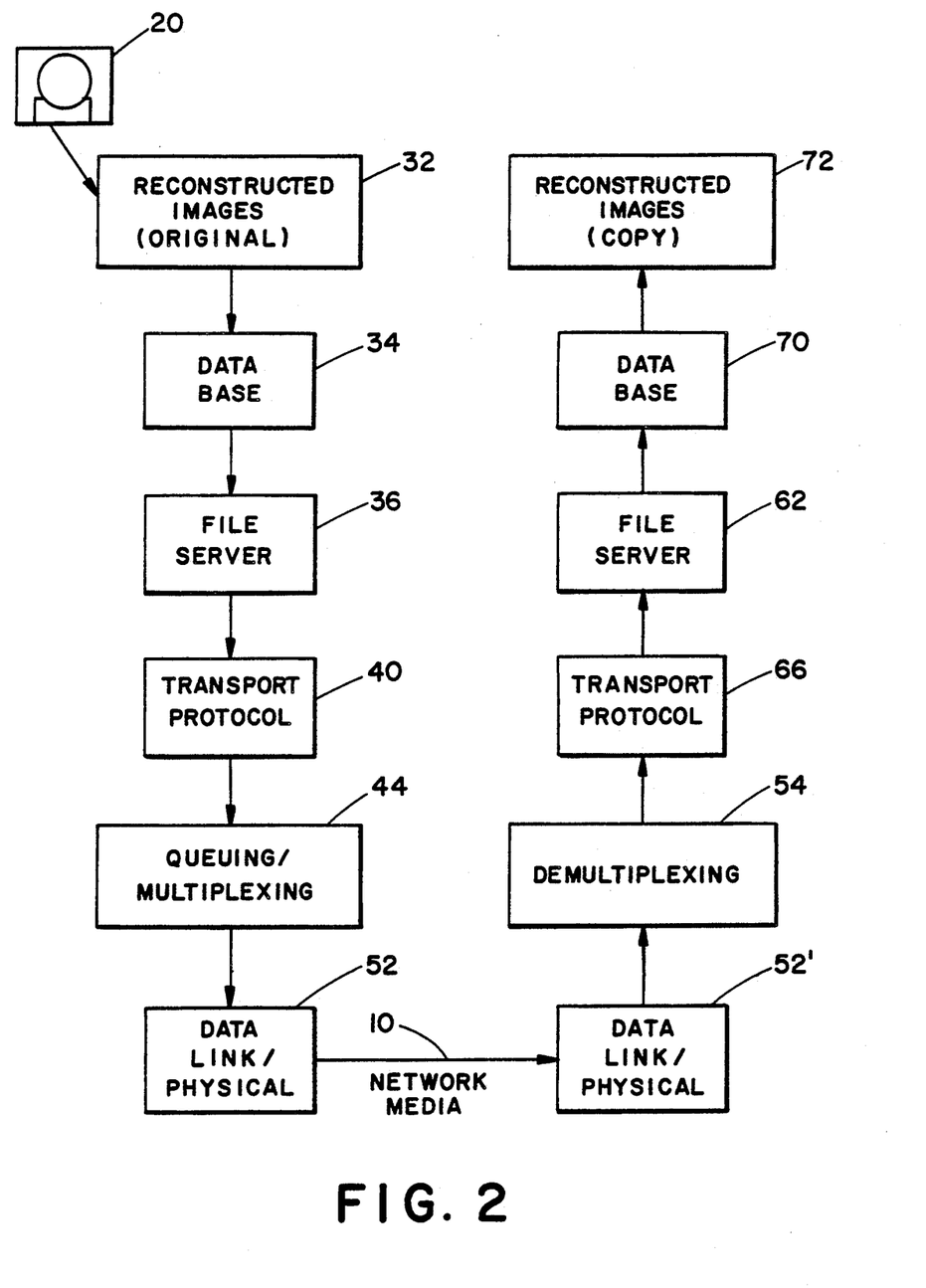
FIG. 2 is a diagrammatic illustration of an exemplary transmit and receive, node of the network of FIG. 1.
Figure 3A:
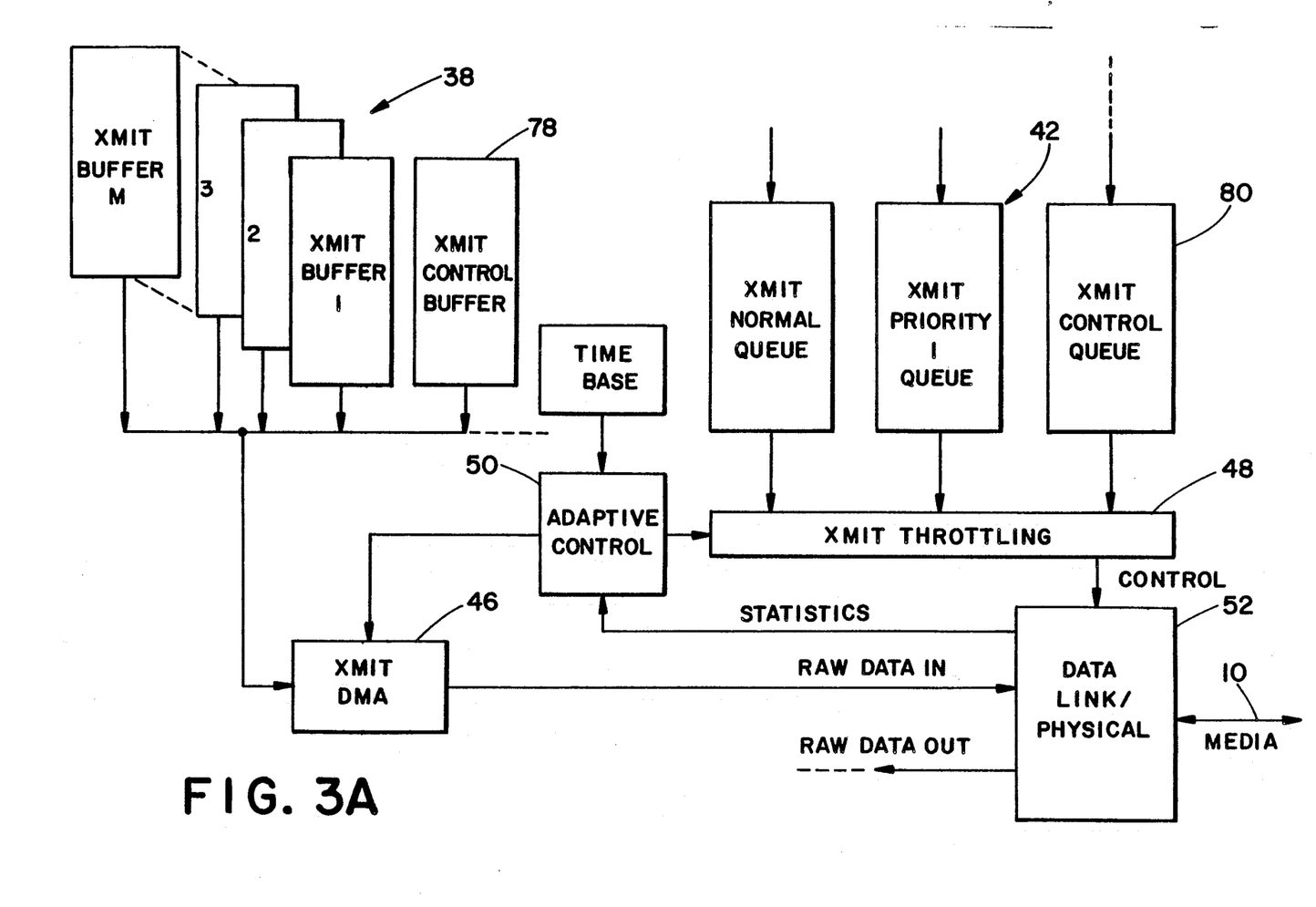
FIGS. 3A and 3B are a more detailed illustration of portions of the transmitting and receiving nodes of FIG. 2.

With reference to FIGS. 2 and 3A, each station node typically has both transmit and receive portions. When a request for an image or other data is made, a transmitting node portion associated with the request receiving station, e.g. one of the CT scanners 20, sends packets of a reconstructed diagnostic image representations from its image memory 32 to the requesting node. When the reconstructed image representations are to be transferred by way of the network A, the image data is transferred through a data base means 34 to a file server 36. The file server typically receives and store an image in its transmit buffers 38. Although the images are referenced herein as being 4 megabytes, it is to be appreciated that images may be much larger or smaller.

Smaller packets of the image data are transferred through a transport protocol means 40 without recopying to queuing buffers 42 of a queuing and multiplexing means 44 under the control of a transmit data management means 46. The size of the packets is matched to the size of the queuing buffers. The queuing buffers are preferably as large as possible but are presently 4 kilobytes due to an unavailability of larger suitable buffer hardware.

The data in the queue buffers 42 may include high priority data in the priority buffer and lower priority data in a normal queue buffer. A transmit ordering means 48 controls the order in which the packets of data in queue buffers 42 are transferred.

In the preferred embodiment, the transmit order is based on three factors: the relative priorities of the data, the statistical probability that the designated receive node will be available to receive the data, and the duration that the data has been waiting in the queuing buffer. More specifically, each of the data packets is assigned a value V:

$$V = aP + bA + cT \quad (1),$$

where P is the relative priority of the data packets, A is the statistical availability of their designated receiving node, T is the duration or time that each of the data packets has been in the queuing memory, and a, b, and c are weighting factors. The weighting factors may be predetermined and assigned based on iterative adjustment, practical experience, or computer implemented system optimizing procedures. In the preferred embodiment, an adaptive control means 50 monitors the efficiency of the transmission of the data network and iteratively adjusts the weighting factors to improve and maintain the optimum efficiency with changing transmission patterns.

The multiplexing means data management means 46 adds appropriate header information to the data as it is moved from the file server buffers 38 to the queuing buffers 42. This header information includes a start delimiter, a destination node address, the source or transmitting node address, the 4 kilobyte data or packet field or information, an end delimiter, and a frame status.

When the transmitting node is authorized to transmit information, a data link means 52 receives the packet data from the designated queue buffer and the header information from the data management means 46 to formulate a message. The message is applied to the network media 10. Typically, the data message moves to the next node in the unidirectional data transmission direction where it is received and retransmitted. This receive and retransmit procedure continues until the receiving node recognizes its address in the header.

Figure 3B:
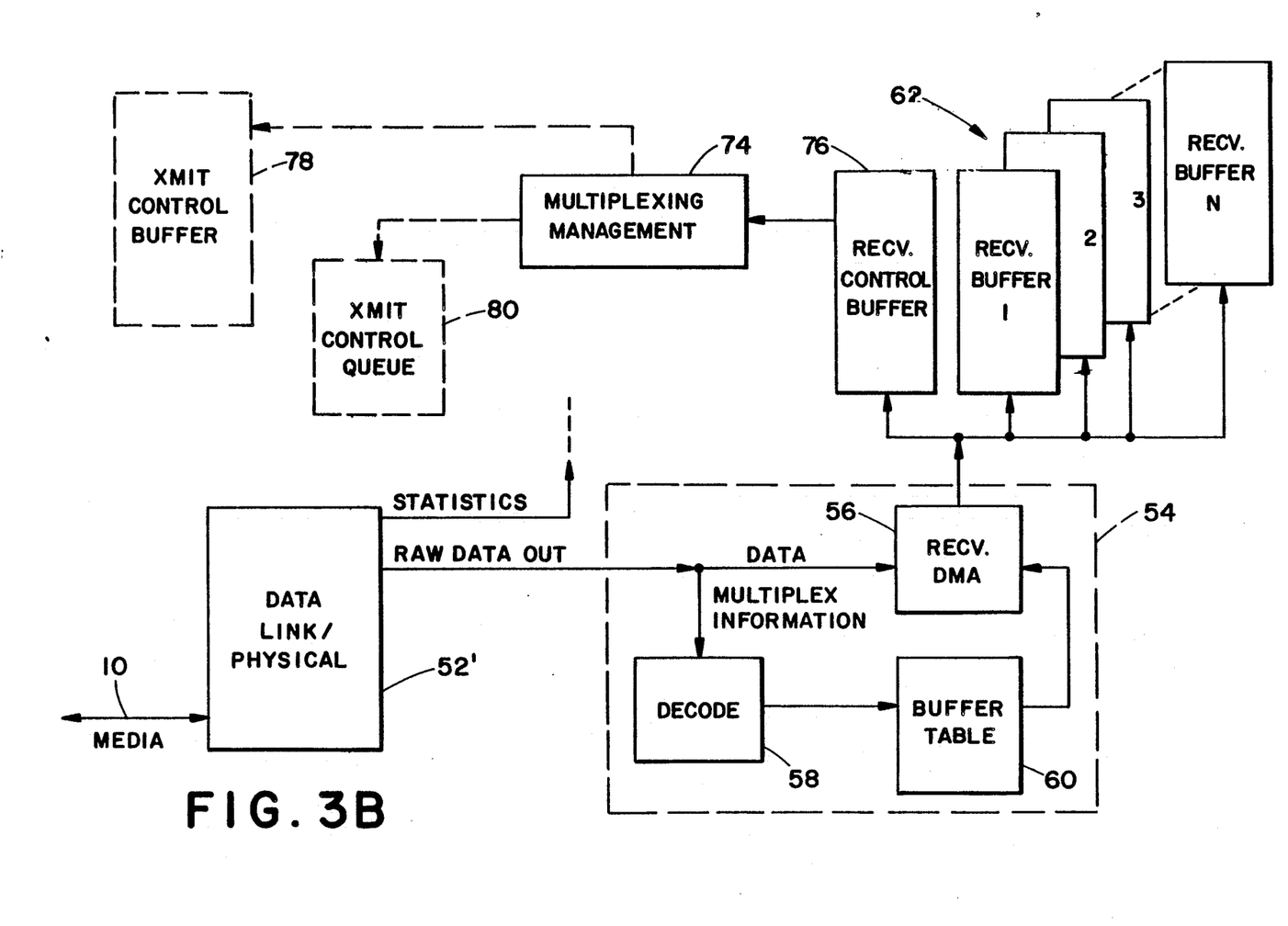

With continuing reference to FIG. 2 and further reference to FIG. 3B, a data link means 52' at the receiving node retrieves the message and transmits it to a demultiplexing means 54. A receive data management means 56 receives the data packet and a decoding means 50 receives the multiplexing means applied headers. The header information is utilized to address a look-up table 60 which looks up the appropriate address for buffers 62 of a file server 64. The headers are used to determine to which of a potential plurality of images each data packet corresponds. For a given designated image, the data packets are received in order. Thus, each received 4 kilobyte field or packet of data is loaded into the receiving buffer memory means 62 in the locations immediately following the preceding data packet of the same image. The buffer table means 60 keeps track of the appropriate starting address for each received packet or the ending address for the precedingly received packet. The received data management means 56 transfers the data packet to the receive buffer memory means 62 at the addresses designated by the buffer table means 60. In this manner, the data is transferred directly to the receive buffer memories of the file server 64 without the inefficiency of recopying by the demultiplexing means 54 or a transport protocol means 66. A data base means 70 transfers the 4 megabyte images to a processor or other portions of the system 72 at the receiving node.

Various techniques may be utilized for adjusting the weighting factors of Equation 1. In a token ring protocol, the queries and the original messages return to the transmitting node with an indication whether they were accepted by the receiving node. A statistical table may be kept of the number of times the query or message comes back with an indication that each receiving node is busy. This information enables the transmit adaptive control means 50 to adjust the selection of packets from the buffers 42 to pick the one which has the best prospects for being received.

A multiplexing management system 74 receives information from a receive control buffer 76 concerning which image or other data is requested. The multiplex management means 74 may be connected with the data link means 52 for placing image data requests on the network A to be communicated to the station that has the requested information. These image data requests are received by the data link 52 of the transmitting buffer and communicated to the appropriate file server and multiplexing means controls 78, 80. Alternately, the requests for data can be transmitted by a separate data channel. The request is communicated to the file server transmit buffer control means 78 for controlling which image representation is to be moved in packets to the queue buffers 42 for transmission to the requesting station. Each information request includes priority information, which is conveyed to the multiplexor control 80 to provide the priority input regarding the order or transmission determination.

Various data management protocols may be utilized for managing the movement of data along the network A. In the preferred embodiment, a token ring type protocol is utilized in which messages are passed downstream from node to node around the ring. When a node detects its own address as the destination address, it copies the data packet into its buffers as described above. When the transmission returns to the transmitting node, the transmitting node strips the message from the ring and passes the token to the next node. In the normal mode of operation, the token is passed after each transmission to assure equal access to the network by all nodes. The token is a control signal that is used to grant a node the privilege to transmit on the ring. A node that wishes to transmit captures the token and removes it from the ring. The transmitting node first sends a query to determine whether the destination node can accept the information packet. A positive acknowledgement is generally returned by the addressed receiving node in the form of trailing indicators that have been modified by the destination to designate its status. The transmitting node now formulates a message including headers as described above and a data packet—in the preferred embodiment, 4 kilobytes. The message is passed from node to node and copied by the destination node if it is available to receive. The destination node modifies the header information or trailing indicators to indicate whether or not it copied the information. When the message is returned to the transmitting node, it removes it from the network and notes whether or not the receiving node copied the information. If the information was copied, the transmitting node readies its next packet of information; if the information was not copied, the transmitting mode prepares to retransmit the packet again. In either instance, the token is passed.

The protocol for controlling each node can be described as two separate state machines that communicate with each other—the receiver state and the transmitter state. Symbols within each packet arrive at the receiver asynchronously to the state of the transmitter. This requires that the receiver receive packets concurrently with other actions which may be being undertaken by the transmitter. The transmitter is informed of various receiver events, such as the reception of a claim packet. Notification occurs through signals that are passed from one state machine to the other. Global signals are used for events that cause responses from both machines. The receiver continuously monitors the signal stream that is being received and detects valid frames and tokens. Packets whose destination address matches the nodes own address are copied if the buffer space is available and the appropriate process is notified. The transmitter is informed of tokens and frames that are received.

The receiver machine enters a listen state when it is initialized. This happens on power up or if a violation has occurred. Violations include a loss of synchronization with an upstream node. Receipt of a valid synchronization symbol indicates that synchronization has been reachieved. The receiver further scans the input symbol stream for commands that indicate the start of either the token or frame packets. The receiver also monitors for receipt of the token, the start of a frame, and the like. If data addressed to the receiver is copied into the buffers, an appropriate flag is set. This flag acknowledges the receipt to the transmitting node.

Figure 4:
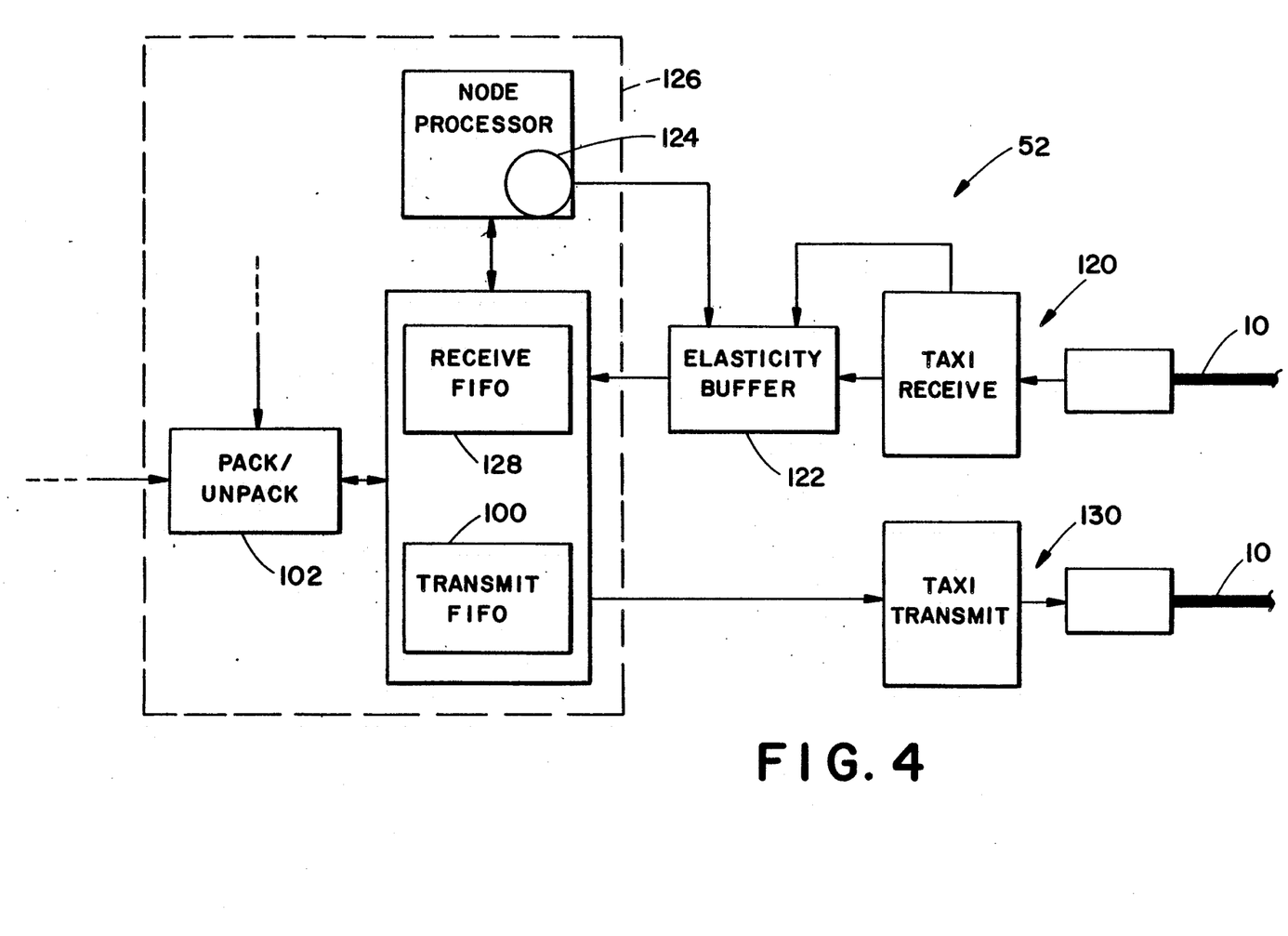
FIG. 4 is a diagrammatic illustration of the data link assembly of FIGS. 2 and 3.

With reference to FIG. 4, when the query comes back to the transmit node that the destination node is available to receive, it moves the data packet into a first in/first out (FIFO) transmit memory 100 of the data link 52. The data packets are set up for m-bit processors; whereas, the networks transfer n-bit data. Typically, m=32 and n=8. However, these values are based on hardware availability and are not constraints on the present invention. An n to m and m to n packing/unpacking means 102 unpaCks the data from m bits to n bit format and packs the data from n to m bit format.

Figure 5:
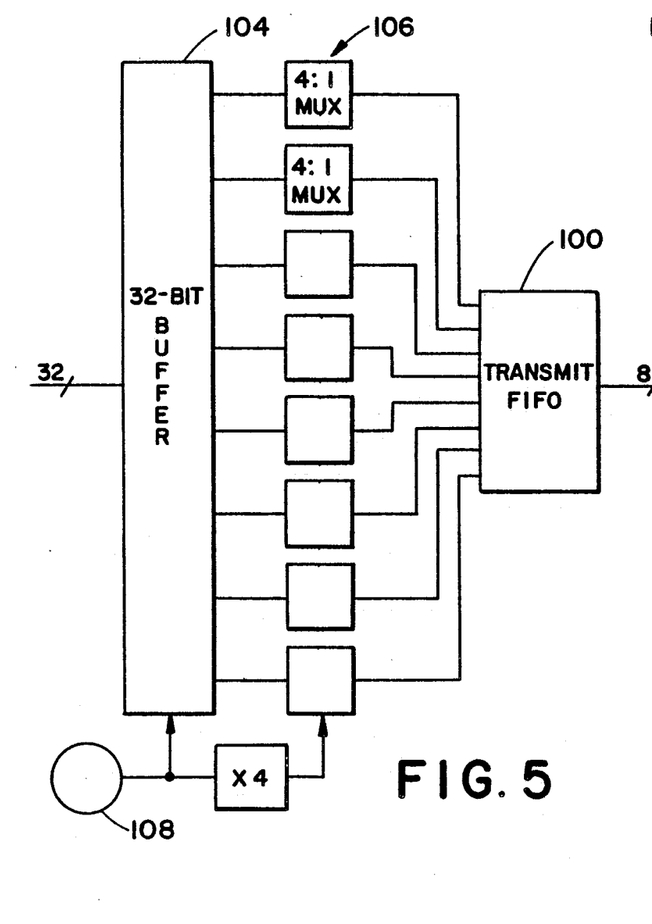
FIG. 5 is a diagrammatic illustration of the unpacking means of FIG. 4.

With reference to FIG. 5, the unpacking means includes an m-bit buffer 104 and n m/n:1 multiplexors 106, e.g. eight 4:1 multiplexors. A clock means 108 clocks the m/n:1 multiplexors m/n times as fast the m-bit buffer 104. There are n one bit lines extending in parallel from the multiplexors to the transmit memory 100 to move n-bit packets of data into the transmit FIFO memory 100. After the multiplexors have been clocked m/n times, the m-bit buffer 104 is clocked to bring in the next m-bit word to be broken down into m/n n-bit words. The next m/n clock cycles strobe the multiplexing means 106 continuing the process.

Figure 6:
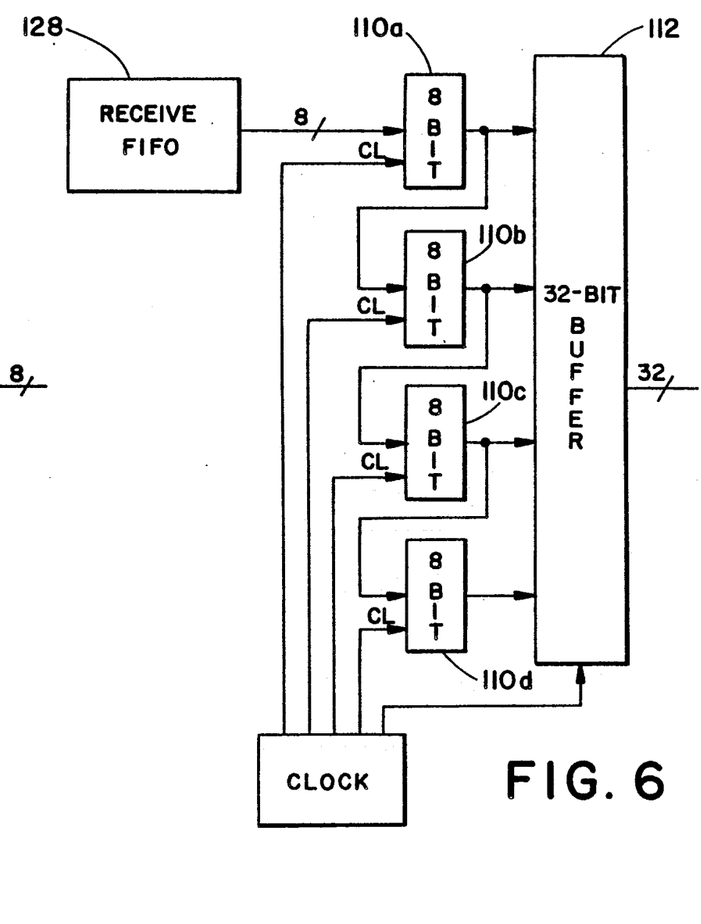
FIG. 6 is a schematic diagram of a packing scheme implemented by the packing means of FIG. 4.

With reference to FIG. 6, when data is received, it is received in n-bit data segments and packed by the packing means into m-bit words. The packing means includes m/n n-bit buffers, in the illustrated embodiment four 8-bit buffers 110a, 110b, 110c, 110d. On the first clock pulse, the first 8-bits are loaded into the first 8-bit buffer 110a. On the second clock pulse, the first 8-bits are moved to the second buffer 110b and the next 8-bits are loaded into the first buffer 110a. Similarly, on the third clock pulse, the data is shifted one buffer such that three of them are filled. On the fourth clock pulse, the first 8-bits are shifted to the fourth buffer 110d, the next 8-bits into the third 8-bit buffer 110c, the second 8-bits into the second 8-bit buffer 110b, and the last 8-bits into the first 8-bit buffer 110a. On the fifth clock pulse, all four 8-bit buffers are clocked simultaneously into a 32-bit buffer 112 forming the 32-bit long word. The number of buffers may be doubled to accommodate a 64-bit processor.

When the message is received at the downstream node, it is converted from an optical signal to an electrical transmission by a converter means 120 and loaded into an elasticity buffer means 122. The elasticity buffer is clocked by timing signals interspersed among the message to load information into the elasticity buffer. The elasticity buffer is also clocked by an internal clock 124 into a protocol defined communications layer 126. If the communications layer 126 recognizes its address in the message, it channels the information to a receive FIFO memory 128, through the packing means 102 and to the receive data management means 56 and the decoding means 58. Also, it clocks the message back to a transmitting means 130 which places the same message back on the network media 10.

It is to be appreciated that the clocks of the transmit and receive buffers transmit at the same frequency with an accuracy of four or five decimal places. However, clocks at the extremes of the tolerance range can build up a surplus or shortfall of several bytes in a 4 kilobyte transmission. Because the size of the packet is only limited by the size of the receive and transmit FIFO memories, larger packets may be transferred as larger FIFO memories become available. Accordingly, it is advantageous to size the elasticity buffer with sufficient capacity to assure that even with larger FIFO buffers and even when plural messages follow back to back or other extreme conditions occur, the elasticity buffer can accommodate a sufficient number of bytes to handle the full deviation in clock speed tolerances, for example, about 5 bytes. It is to be appreciated that the elasticity buffer has no address ports, data is just strobed in as it is received at the transmitting node clock rate and strobed out as it is ready for retransfer or copying at the receive node clock rate.

When the node seizes a token, it can generate packets on the ring. If the node needs to utilize the network for an extended duration, it issues a restricted token. Other nodes having high priority small packets of data to transmit put out a priority flag. When a restricted token is passed around, the node with the priority flag can capture the restricted token and transmit a small packet of priority data. In this manner, associated equipment such as a laser imager which has a very small buffer, e.g. two lines, and must move its data around the network almost immediately to make room for the next lines, can keep control of the network while still allowing small data packets to be transferred in the time between lines.

Periodically, one of the nodes functions in a management capacity to verify the nodes in the network. It sends out a message with an address that is recognized by every node and instructions for each node to add its address to the end of the message. When the transmitting node again receives the message, it contains a list of each node on the network in order. The managing node then formulates an ordered node list which is transmitted to all nodes.

Each node continuously monitors the headers and trailing symbols of each message. The reception of frame indicators directs the nodes to monitor the fields which instruct each receiving node how to handle the message. The symbols can be indicative of the setting up of an ordered data node list, that information should be copied by all nodes, that the message may be stripped from the ring, whether the packet is valid, or the like.

A ring error recovery is accomplished with a claim process. When a node detects the absence of packet transmissions, it begins the claim process by generating a claim packet. Nodes receiving the claim packet with a source address less than their own pass on the received packets. A node that receives a claim packet with a source address greater than its own will remain in the claiming token state. A node that receives its own claim packet back will have won the arbitration and can generate a token. The failure of the node to receive a claim packet during the claim process indicates a serious ring fault. The node then enters a beacon process in which it generates a beacon packet that is receivable by all nodes. A node that receives its own beacon packet back having circumnavigated the ring, enters the claim process to begin initialization of the ring.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiments, the invention is now claimed to be:

1. A data transfer network comprising:
a network media extending between each of a plurality of nodes including first and second nodes which have first and second clocking rates that are the same to at least three decimal places;
a means for generating image representations connected with one of the nodes, each image representation including a block of image data;
means for processing image data connected to another of the nodes;
the first node including:
buffer means for storing each of a plurality of image data packets, which taken together comprise an image data block, each image data packet being sufficiently large that a difference in a time for clocking the data packet at the first and second clocking rates is at least one clock cycle of the faster of the first and second clocking rates, whereby during an image data packet transfer between the first and second nodes, one of the nodes would attempt to clock at least one more element of data than the other,
a first data link means for transmitting each data packet and synchronization information on the network media, the synchronization information being related to the difference in clocking time,
a transmit data management means for controlling the transfer of data and synchronization information between the buffer means and the data link means;
the second nodes including:
a second data link means for receiving the data packet from the network media;
an elasticity buffer into which data is clocked at the first clocking rate from the network media and out of which data is clocked at the second clocking rate, the elasticity buffer having sufficient storage to accommodate an accumulation of bits of data attributable to any excess in the speed of the first clocking rate relative to the second clocking rate,
a synchronization information means for receiving the synchronization information causing a delay in clocking out the data from the elasticity buffer to accommodate any excess in speed of the second clocking rate relative to the first clocking rate,
a receiver memory means for storing at least one image data block,
a receive data management means for transferring image data packets from the second data link means to the receiver memory means, and,
a receiver memory address control means for monitoring addresses of the receiver memory means at which prior image packets are stored and providing receiver memory addresses for each received image data packet.

2. A data transfer network comprising:
a network media extending between each of a plurality of nodes;
a means for generating image representations connected with one of the nodes, each image representation including a block of image data;
a means for processing image data connected to another of the nodes;
a first of the nodes including:
buffer means for storing each of a plurality of image data packets, which taken together comprise one image data block,
a first data link means for transmitting each data packet on the network media,
a transmit data management means for controlling the transfer of data packets of a selected image representation between the buffer means and the data link means,
a transmit control means for controlling the image representations to be transmitted by the transmit data management means;
a second of the nodes including:
a second data link means for receiving the data packet from the network media;
a receiver memory means for storing at least one image data block,
a receive data management means for transferring image data packets from the second data link means to the receiver memory means,
a receiver memory address control means for monitoring addresses of the receiver memory means at which prior image packets are stored and providing receiver memory addresses for each received image data packet,
a receiver memory control means which is responsive to operator input to request the selected image representation, the receiver memory control means issuing an electronic request for the requested image representation, the receiver memory control means and the transmit control means being operatively connected for the transfer of the electronic requests therebetween.

3. The network as set forth in claim 2 wherein the first node includes a plurality of queuing buffers, which hold image packets selected by different network nodes, a transfer of one of the data packets having a higher priority than the other, a transmit throttling means for controlling which of the data packets in the queuing buffers is passed to the data link means to be transmitted on the network media first, the transmit throttling means assessing the assigned priority of the data packets, a duration that each data packet has been in the queuing buffers, and a statistical probability that a designated receiving node is available to receive the data packet.

4. A data transfer network comprising:
a network media extending between each of a plurality of nodes;
a means for generating image representations connected with one of the nodes, each image representation including a block of image data;
a means for processing image data connected to another of the nodes;
a first of the nodes including:
buffer means for storing each of a plurality of image data packets, which taken together comprise an image data block,
a first data link means for transmitting each data packet on the network media,
a transmit data management means for controlling the transfer of data between the buffer means and the data link means;
a second of the nodes including:
a second data link means for receiving the data packet from the network media;
an elasticity buffer into which data is clocked at a clocking rate of data received from the network media and out of which data is clocked at a clocking rate of the receiving data link, the elasticity buffer having sufficient storage to accommodate a shortfall or accumulation of bits of data attributable to differences in the clocking rates of the transmitted data and the receiving data link,
a packing means for packing data received from the elasticity buffer in a n-bit format into a m-bit format, where m is greater than n, the packing means including a plurality of n-bit buffers, a clocking means for clocking incoming data serially through the n-bit buffers until the n-bit buffers are filled, the clocking means concurrently clocking the n-bit buffers into an m-bit buffer and clocking m-bit data from the m-bit buffer,
a receiver memory means for storing at least one image data block,
a receive data management means for transferring image data packets from the second data link means to the receiver memory means, and,
a receiver memory address control means for monitoring addresses of the receiver memory means at which prior image packets are stored and providing receiver memory addresses for each received image data packet.

5. The network as set forth in claim 4 wherein the buffer means stores data in m-bit format and further including an unpacking means for converting the m-bit data to n-bit data, the unpacking means including:
an m-bit buffer for receiving m-bit words;
n multiplexor means connected with the m-bit buffer;
a clocking means for clocking the n multiplexor means and the m-bit buffer, the clocking means clocking the multiplexor means about m/n times as fast as the m-bit buffer such that each clocking of the n multiplexor means generates an n-bit word for transmission on the network media.

6. A data transfer network comprising:
a network media extending between each of a plurality of nodes;
a means for generating image representations connected with one of the nodes, each image representation including a relatively large block of image data;
a means for processing image data connected to another of the nodes;
a first of the nodes including:
buffer means for storing each of a plurality of image data packets, which taken together comprise an image data block,
a first data link means for transmitting each data packet on the network media,
a management means for generating a receive query to a designated receiving node when it is ready to transmit an image data packet to determine whether the designated receive node is available to receive data packets and for transmitting the data packet with appropriate address headers when a reply to the query is received;
a second of the nodes including:
a second data link means for receiving the data packet from the network media;
a receiver memory means for storing at least one image data block,
a receive data management means for transferring image data packets from the second data link means to the receiver memory means, and,
a receiver memory address control means for monitoring addresses of the receiver memory means at which prior image packets are stored and providing receiver memory addresses for each received image data packet.

7. The network as set forth in claim 6 wherein a token, only the node with the token being permitted to transmit, the management means of the node with the token including means for selectively generating a restricted token which is passed to other nodes to enable only small packets of data to be transmitted on the network media, the small packets of data being smaller than the image data packets.

8. A data transfer network comprising:
a network media extending between each of a plurality of nodes;
a means for generating image representations connected with one of the nodes, each image representation including a relatively large block of image data;
a means for processing image data connected to another of the nodes;
a first of the nodes including:
buffer means for storing each of a plurality of image data packets, which taken together comprise an image data block, a first data link means for transmitting each data packet on the network media in n-bit format, a transmit data management means for controlling the transfer of data between the buffer means and the data link means;

a second of the nodes including:

a second data link means for receiving the data packet from the network media;

a packing means for packing data received at the second data link means in the n-bit format into an m-bit format, where m is an integer greater than n, the packing means including m/n n-bit buffers, a clocking means for clocking incoming data serially through the n-bit buffers until the n-bit buffers are filled, the clocking means concurrently clocking the n-bit buffers into an m-bit and clocking m-bit format data from the m-bit buffer;

a receiver memory means for storing at least one image data block, a receive data management means for transferring image data packets from the packing means to the receiver memory means.

9. A data transfer network comprising:

a network media extending between each of a plurality of nodes;

a means for generating image representations connected with one of the nodes, each image representation including a relatively large block of image data;

means for processing image data connected to another of the nodes;

a first of the nodes including:

buffer means for storing each of a plurality of image data packets in an m-bit format, a first data link means for transmitting each data packet on the network media in an n-bit format, where n is an integer and m is an integer that is an even multiple of n, an unpacking means for converting the m-bit format to n-bit format data, the unpacking including:

an m-bit buffer for receiving words of m-bit format;

n multiplexor means connected with the m-bit buffer;

a clocking means for clocking the multiplexor means and the m-bit buffer, the clocking means clocking the multiplexor means about m/n times as fast as the m-bit buffer such that each clocking of the n multiplexor means generates an n-bit format word for transmission on the network media, a transmit data management means for controlling the transfer of data between the buffer means and the data link means;

a second of the nodes including:

a second data link means for receiving the data packet from the network media, a receiver memory means for storing at least one image data block, a receive data management means for transferring image data packets from the second data link means to the receiver memory means.

10. A data transfer network comprising:

a network media extending between each of a plurality of nodes;

means for generating and processing large blocks of data connected with a plurality of the nodes;

a first of the nodes including:

a data link means for receiving a plurality of data packets which taken together comprise one of the large blocks of data from the network media;

a memory means for storing the large block of data;

a receive data management means for transferring each of the received data packets from the data link means to the memory means;

a memory address control means for monitoring addresses of the memory means at which previously received ones of the data packets are stored and providing memory addresses for each subsequently received data packet such that the received data packets are reassembled into the one large data block;

a completion of reception detection means for signaling that the one large data block has been received.

11. A data transfer network comprising:

a network media extending between each of a plurality of nodes;

means for generating and processing large blocks of data connected with a plurality of the nodes;

a first of the nodes including:

a data link means for receiving a plurality of data packets in an n-bit format which data packets taken together comprise one of the large blocks of data from the network media;

a memory means for storing the large block of data in an m-bit format;

a packing means for packing n-bit format data received by the data link means into m-bit format data for storage in the memory means;

a receive data management means for transferring each of the received data packets from the data link means to the memory means; and, a memory address control means for monitoring addresses of the memory means at which previously received ones of the data packets are stored and providing memory addresses for each subsequently received data packet.

12. The network as set forth in claim 11 wherein the data link means includes an elasticity buffer into which the data packets are clocked in at a clocking rate of an upstream transmitting node and out of which data is clocked to the memory means at a clocking rate of the receiving node.

13. A data transfer network comprising:

a network media extending between a plurality of nodes for transferring data in an n-bit format;

a means for processing large blocks of data connected with at least some of the nodes;

a first of the nodes transmitting data to a second of the nodes, the second node including an elasticity buffer into which data from the first node is clocked at a clocking rate of the first node and out of which the data is clocked at a clocking rate of the second node, the elasticity buffer including a packing means for packing the n-bit format data into m-bit format data, where n is an integer and m is an integer which is an even multiple of n, the packing means including:

m/n serially connected n-bit buffers;

a clocking means for clocking incoming data serially through the n-bit buffers until the n-bit buffers are filled, the clocking means further concurrently clocking all m/n n-bit buffers to clock out an m-bit format word.

14. A data transfer network comprising:
a network media on which data is passed in n-bit format, where n is an integer, the network media extending between a plurality of nodes;
means connected with the nodes for processing and handling blocks of m-bit format data, where m is an integer that is an even multiple of n;
at least one of the nodes including:
   a data link means for receiving n-bit data from the network media,
   m/n serially connected n-bit buffers,
   a clocking means for clocking n-bit data from the data link means serially through the n-bit buffers until the n-bit buffers are filled and when the n-bit buffers are filled concurrently clocking the m/n n-bit buffers to pass an m-bit format word to the associated one of the data processing and handling means.

15. The network as set forth in claim 14 wherein a second of the nodes includes:
   an m-bit buffer means for storing a plurality of packets of m-bit data to be transferred on the network media, each stored packet awaiting transmission to a designated other receiving node, each of the packets having a relative priority and each of the designated receiving nodes having a statistical probability of availability to receive packets;
   an unpacking means for converting data packets stored in m-bit buffer means to n-bit format data for transmission on the network media;
   a second data link for transmitting the n-bit data on the network media; and,
   a means for selecting an order in which the data packets are passed from the m-bit buffer means to the unpacking and data link means in accordance with a combination of the relative priority of each packet and the statistical availability of the designated receiving node for each packet.

16. A data transfer network comprising:
a network media extending between each of a plurality of nodes;
a means for processing and handling data connected with the nodes;
a first of the nodes including:
   means for storing a plurality of data packets, each packet being designated for transmission to one of the other receiving nodes and being assigned a relative transmission priority, each designated receiving node having a statistical probability of availability to receive a transmitted data packet;
   a data link means operatively connected with the memory means and the network media for transmitting data packets serially on the network media;
   a data packet order determining means for determining an order in which the data link means transmits the stored data packets on the network media in accordance with a weighted combination of the assigned priority of each packet and the statistical availability probability of the corresponding designated receiving node.

17. A method of transferring packets of data among a plurality of nodes that are interconnected by a network media, the method comprising:
   at one of the nodes, storing a plurality of packets of data each of which is waiting transmission on the media to a designated one of the other nodes, each packet having a designated priority and each designated node having a statistical probability of availability to receive a packet;
   serially transmitting the awaiting packets on the network media in an order established by a combination of both the relative priority of each packet and the statistical availability of the corresponding designated node.

18. The method as set forth in claim 17 further including before each packet is transmitted, transmitting a query to the designated receiving mode to inquire whether it is available to receive a data packet.

19. A method of transferring data among a plurality of nodes interconnected by a network, the method comprising:
   at a first of the nodes, storing at least one large block of image data and serially transmitting smaller data packets of the large block of data on the network in an n-bit format to a second node;
   at the second node, serially receiving the data packets from the network media and packing the received n-bit data into an m-bit format, where m is an integer which is greater than and an even multiple of n, the packing step including serially clocking incoming data into each of m/n n-bit buffers until the n-bit buffers are filled and concurrently clocking the n-bit buffers to transfer an m-bit word therefrom, and storing the m-bit words in a memory.

20. A method of regulating bandwidth allocation on networks which permit equal access to each of a plurality of nodes along the network in which only a node which has a token is permitted to place large data packets and small data transmissions on the network, the method comprising:
   passing a first token from node to node, nodes that have large blocks of data to pass, passing the large blocks of data and the first token, nodes that have small data transmissions to pass passing the small data transmissions and the first token and nodes which have no data to pass, passing the first token;
   when the first token reaches a node that requires greater bandwidth, the node which requires the greater bandwidth (i) holding the first token, (ii) entering a restricted mode, (iii) transmitting a large block of data, and (iv) passing a restricted token;
   each node which receives the restricted token which is not in the restricted mode passing one of the restricted token alone and the restricted token and a priority small data transmission and each node which receives the restricted token which is in the restricted mode, passing one of the restricted token alone and the restricted token and a large data packet;
   when the restricted token returns to the node holding the first token, the node holding the first token passing one of (i) the first token alone, (ii) the first token and a large data packet, and (iii) another restricted token, whereby nodes which require more bandwidth, such as nodes transferring image data in real time, are accorded greater access to the network than nodes requiring less bandwidth.

* * * * *